United States Patent

Emmons

[15] 3,665,099

[45] May 23, 1972

[54] MAINTAINING A SPACE BETWEEN SHEETS FROM AND ONTO WHICH DOCUMENT IMAGES ARE TRANSDUCED

[72] Inventor: Lawrence D. Emmons, Santa Clara, Calif.

[73] Assignee: Ampex Corporation, Redwood City, Calif.

[22] Filed: Jan. 28, 1971

[21] Appl. No.: 110,614

Related U.S. Application Data

[63] Continuation of Ser. No. 800,954, Feb. 20, 1969, abandoned.

[52] U.S. Cl. ..........................178/6.7 R, 178/6.6 A, 346/110, 355/20

[51] Int. Cl. ......................G03b 1/60, H04n 1/12, H04n 1/28

[58] Field of Search ...............178/6.6 R, 6.6 A, 6.7 R, 6.7 A, 178/7.2 D; 346/110; 355/20

[56] References Cited

UNITED STATES PATENTS 3,084,213 4/1963 Lemelson............................178/6.7 R
3,410,954 11/1968 Erde...................................178/6.7 R
3,422,218 1/1969 Byer...................................178/6.6 A
3,479,451 11/1969 Regunberg..........................178/6.6 R

*Primary Examiner*—Howard W. Britton

[57] ABSTRACT

As a beam is deflected to transversely scan sheets as they are conveyed past the deflected beam for transferring image intelligence between a document image form on the sheet and a video signal form for processing by a video processing circuit, the beam is deflected in the direction of the travel of the conveyed sheets at a velocity relative to the velocity of travel of the sheets to produce complementary motion so that the entire sheet is scanned by the beam during a single frame video signal. The operations of the video processing circuit, sheet transport mechanism and beam deflection signal generator are time synchronized with the vertical synchronizing signal associated with the video signal such that each sheet is positioned at the location at which the first upstream line of the raster of scanned lines is produced when the deflections of the beam and transduction of the video intelligence signal is commenced.

16 Claims, 6 Drawing Figures

Patented May 23, 1972 3,665,099

3 Sheets-Sheet 1

INVENTOR.
LAWRENCE D. EMMONS

BY Robert G. Clay

ATTORNEY

INVENTOR.
LAWRENCE D. EMMONS

BY Robert S. Clay
ATTORNEY

INVENTOR
LAWRENCE D. EMMONS

BY Robert G. Clay

ATTORNEY

MAINTAINING A SPACE BETWEEN SHEETS FROM AND ONTO WHICH DOCUMENT IMAGES ARE TRANSDUCED

This application is a continuation of co-pending application Serial No. 800,954 filed Feb. 20, 1969, now abandoned.

FIELD OF THE INVENTION

The present invention relates to a technique for maintaining a space between consecutively conveyed sheets from or onto which document images are transferred in rapid succession into or from discrete video intelligence signals. More particularly, it is a technique for maintaining a space between consecutive sheets conveyed for scanning by a defined beam of electromagnetic radiation for transferring document images from or into discrete video intelligence signals by deflecting the beam in the direction the sheets are conveyed in a synchronized relation with the conveyance of the sheet. Electromagnetic radiation is used herein in the accepted scientific sense to mean moving nuclear particles, as well as radiation, at all frequencies commonly classified as radio frequency and microwave frequency Hertzian, infrared, visible, ultraviolet, x-rays and $\gamma$-rays.

BACKGROUND OF THE INVENTION

In large capacity, automatic document storage and retrieval systems and facsimile systems for transmitting the information on large quantities of documents between separated terminal stations wherein the information on discrete document sheets are converted to single frame video intelligence signals for storage or transmission between separated terminal stations, the speed of the system is dependent upon, and often is limited by, the rate at which the information on the document can be transferred into a single frame video intelligence signal. To transfer the document information into single frame video intelligence signals for subsequent storage or transmission to a remote terminal station, the sheets of documents, such as papers, film, slides or other such image information carrying media, are consecutively conveyed to be scanned by a beam of a camera tube, e.g., image orthicon, vidicon, flying spot or laser scanners. The interaction of the beam and the document under examination develops a video intelligence signal proportional to the light intensity of the portion of the document being observed. The video intelligence signal is combined with scan synchronizing signals to form the composite video signal for subsequent storage or transmission.

When reproducing the document image from the video intelligence signal carried by a stored or transmitted video signal, sensitized copy sheets, such as photoelectrostatic sheets, are consecutively conveyed past a beam, such as generated by a fiber optic line scan cathode ray tube. During reproduction, the video intelligence signal intelligence modulates the beam while it is deflected transversely of the direction of the travel of the sheet. The intelligence modulated beam transfers the image represented by the video intelligence signal to the sheet, for example, in electrostatic printing, as a latent image in the form of a charge pattern. The charged sheet is passed through a developer to develop the latent image and, thereby, provide a hard copy form of the stored or transmitted document image.

In large capacity, automatic document transmitting or document storage and retrieval systems, it is desirable to convey the document or copy sheets consecutively at high speeds for scanning by a beam. However, heretofore the speed at which the sheets could be conveyed has been seriously limited by the inability to maintain a separation between the consecutively conveyed sheets. When a separation is not maintained between consecutive sheets, the sheets tend to overtake each other as they are conveyed. If the leading and trailing edges of consecutive sheets abut, it is exceedingly difficult to detect reliably the edges at high sheet transport speeds. Since it is important, particularly, when printing, to be able to detect the leading and trailing edges of sheets in order to control the movement of the copy sheets through the printer, such abutting should be avoided. In addition, if abutting consecutive sheets overtake each other so as to overlap, one of the overlapping sheets will block a portion of the other from being scanned by the beam whereby a part of the image or video intelligence signal may be lost. Furthermore, abutting and overlapping sheets often become jammed in the sheet transport mechanism. When jamming occurs, the image transferring operation must be interrupted and the jam cleared before it is resumed. Such jamming can not be tolerated in a high speed, automatic system for transferring document images from or into discrete single frame video intelligence signals.

Considerable advantage is therefore to be gained by maintaining a separation between consecutively conveyed sheets whereby the adjacent leading and trailing edges of consecutive sheets are maintained spaced apart as the sheets are conveyed for scanning by a defined beam of electromagnetic radiation for transferring image intelligence from or into single frame video intelligence signals. Additional advantages are to be gained by synchronizing the conveyance of the sheets and the operation of the source of the beam to the composite video signals carrying the video intelligence signals.

SUMMARY OF THE INVENTION

Accordingly, it is an object of this invention to transfer information from or onto large quantities of document or copy sheets conveyed rapidly in succession for scanning by a defined beam of electromagnetic radiation without jamming or loss of information.

More particularly, it is an object of this invention to maintain a separation between the adjacent leading and trailing edges of consecutively conveyed sheets from or onto which document images are transferred into or from video intelligence signals as the sheets are conveyed through various stations of the image transferring system.

Another object of this invention is to maintain a separation between the adjacent leading and trailing edges of adjacent sheets from or onto which document images are transferred into or from video intelligence signals by a defined beam of electromagnetic radiation as the sheets are conveyed in a synchronizing relation with the operation of the source of the image transferring beam.

In accordance with the present invention, the foregoing objects are realized by deflecting a defined beam of electromagnetic radiation in the direction of travel of a conveyed sheet as the beam transversely scans the sheet to transfer image intelligence between a document image form and a single frame video intelligence signal form. The deflection of the beam, the transverse beam scan of the sheet and the conveyance of the sheet are time synchronized to the frame scan synchronizing signal associated with the composite video signals which carries the video intelligence signals being transferred. More particularly, in accordance with the technique of the present invention, a signal in time synchronized relation with the frame scan synchronizing pulse signal associated with single frame composite video signals commences the conveyance of a sheet through a transducing station for line scanning by the beam generated thereat by a source of electromagnetic radiation. When the leading edge of the conveyed sheet is at the position in the transducing station at which the first upstream line of the raster of scanned lines is formed on the sheet as the beam is scanned, a signal in time coincidence with the frame scan synchronizing pulse commences the deflection of the beam simultaneously in the direction of and transverse to the travel of the sheet through the transducing station. Simultaneously with the commencement of the beam deflections, the signal in time coincidence with the frame scan synchronizing pulse commences the transfer of image intelligence between the document image form and the single frame video intelligence signal form. Since the beam is deflected in the direction of the travel of the sheet through the transducing station, each transverse line scan of the sheet occurs further downstream from the entrance of the transducing station than the immediately previous transverse line scan. The final transverse line scan of the sheet occurs at the exit of the transducing station which is downstream from the entrance a selected distance determined by the deflection signal causing the deflection of the line scanning beam in the direction of the travel of the sheet. Hence, since the first and final line scans of the sheet occur at positions in the transducing station separated by the selected distance, the final transverse line scan of one sheet is separated from the first transverse line scan of next sheet of the consecutively conveyed sheets by the selected distance. By synchronizing the conveyance of the sheets so that the first transverse line scan occurs at a particular location relative to the leading edge of each of the sheets conveyed through the transducing station, the adjacent leading and trailing edges of consecutively conveyed sheets can be maintained spaced apart by the selected distance separating the transducing station locations of the first and final transverse scans of the sheets, thereby, eliminating the problems associated with abutting and overlapping consecutively conveyed sheets.

BRIEF DESCRIPTION OF THE DRAWINGS

The foregoing and other advantages and features of the present invention will become apparent from the following description and claims considered together with the accompanying drawings of which:

DESCRIPTION OF THE PREFERRED EMBODIMENT

Figure 1:
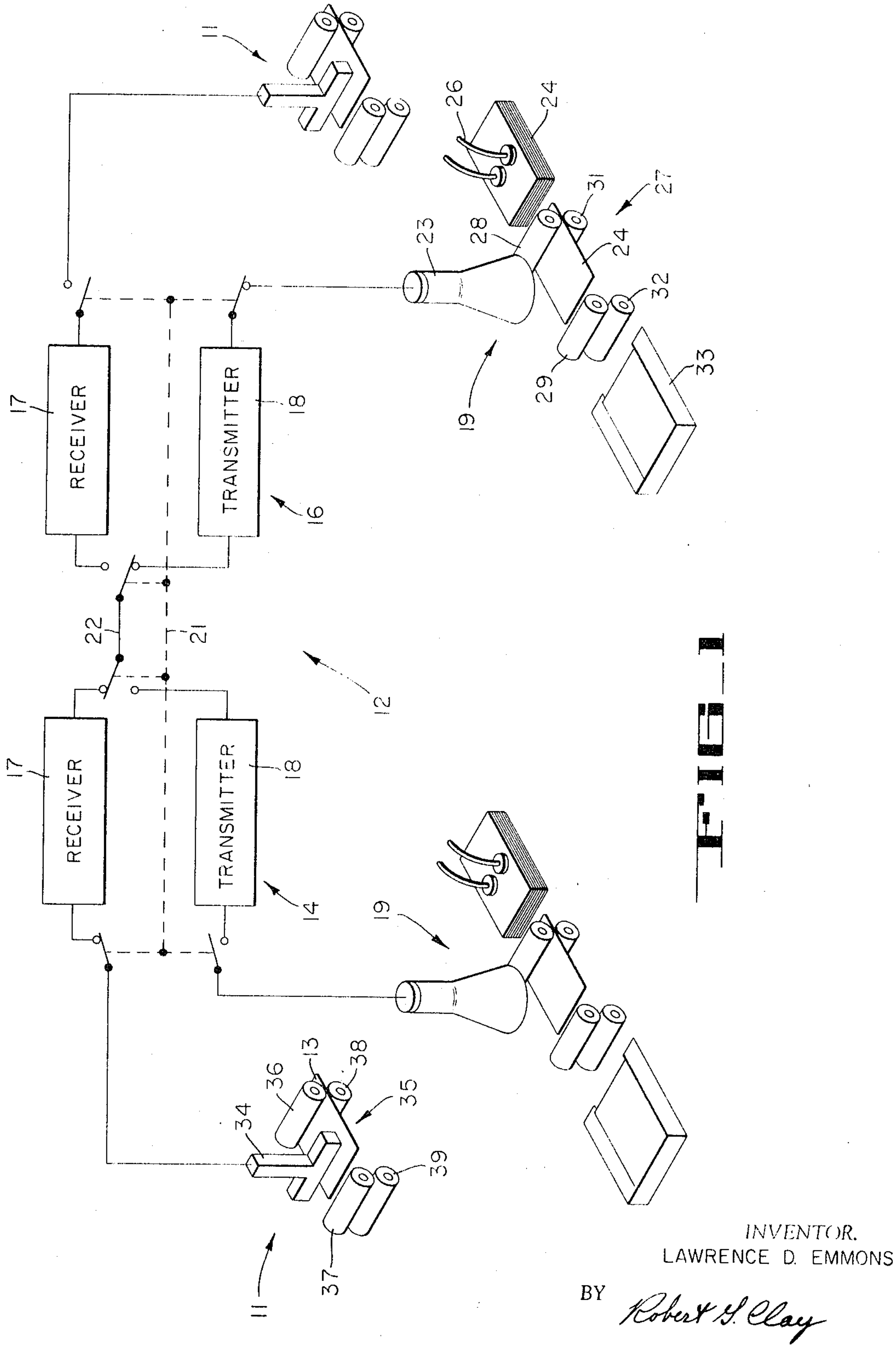
FIG. 1 is a schematic diagram of a facsimile system for transmitting video intelligence signals of document images between separated terminal stations.

Referring to FIG. 1, a printer 11 receives single frame video intelligence signals of discrete document images from a video signal processing means or source 12 and transfers the discrete document images onto copy sheets 13 consecutively conveyed through the printer 11. In FIG. 1, the video signal source 12 is shown as facsimile system for transmitting composite video signals between separated terminal stations 14 and 16, each of which includes a video signal processing receiver 17 which is associated with the printer 11 and a video signal processing transmitter 18 which is associated with a document reader 19. When, for example, transmitting document images from the terminal station 16 to the terminal station 14, a switching means 21 is operated to ready the receiver 17 of station 14 to receive via a telecommunications link 22 the composite video signals from the transmitter 18 of station 16. An image camera tube 23 converts the image carried by each of the documents 24 into a single frame video intelligence signal which is prepared for transmission by the transmitter 18. When transmitting several document images, the documents 24 are consecutively conveyed from a document feeder 26 through a read transducing station 27 by a driven feed roller 28 and driven discharge roller 29 respectively operating against idler rollers 31 and 32. As the documents 24 pass through the read transducing station 27, the beam of the camera tube 23 is deflected to scan the documents under the control of the frame or vertical synchronizing signal and the line or horizontal scan synchronizing signals provided by the synchronizing signal generator of the transmitter 18. The camera tube 23 provides the discrete single frame video intelligence signals. A collecting bin or tray 33 is provided to collect the scanned documents 24 as they are discharged by the document reader 19.

The transmitter 18 prepares each single frame composite video signal of the document images for transmission. Appropriate synchronizing signals, including the frame and line scan synchronizing pulses, are added to the single frame video intelligence signal received from the camera tube 23 to form the composite video signal and, when necessary, the composite video signal is coupled to modulate an rf carrier wave.

The video signal processing receiver 17 at the remote terminal station 14 receives the transmitted single frame composite video signals from the telecommunications link 22 and demodulates the composite video signal, separating individually the video intelligence signal, and the frame and line scan synchronizing pulses. The video intelligence signal is coupled to a defined beam source 34 to modulate its beam while it scans the copy sheet 13 under the control the the synchronizing pulses as the copy sheet is conveyed through the reproduce transducing station 35. The copy sheets 13 are conveyed through reproduce transducing station 35 by a driven feed roller 36 and a driven discharge roller 37 respectively operating against opposing idler rollers 38 and 39.

To avoid jamming of the sheets as they are conveyed through the printer 11 and document reader 19, as well as the other problems associated with abutting and overlapping adjacent edges of consecutively conveyed sheets, the scanning beam of each of the beam sources 23 and 24 is deflected in the direction of the motion of the sheets through the respective transducing stations 27 and 35. Also, the converting of the video intelligence signals and the conveyance of the sheets are time synchronized with the deflection of the scanning beam.

The manner in which the time synchronization is accomplished in accordance with the present invention will be described with reference to a photoelectrostatic type printer 11 illustrated in FIG. 2 employing a line scan cathode ray tube type beam source 34 to provide hard copies of document images stored in the form of single frame sequential line scan composite video signals on a disc type magnetic recording medium of a video signal source 12. However, as will become even more apparent from the following detailed description, the technique of the present invention can be employed in any system in which a beam of electromagnetic radiation is scanned relative to sheets conveyed for transferring document images from or to corresponding video intelligence signals. Furthermore, with appropriate switching circuits, document images also can be transferred from or to corresponding interlaced line scan composite video signals. For example, a laser beam could be modulated with the video intelligence signal and deflected while it scans a light sensitive copy sheet 13, such as photographic film. If other types of electromagnetic radiation are used to form the image transferring beam, the copy sheet would be selected so as to be sensitive to that form of electromagnetic radiation or, as in the case of the photoelectrostatic printer 11 illustrated in FIG. 2, the defined beam of electromagnetic radiation would be impinged on an intermediate responsive medium to provide corresponding different electromagnetic radiation to which the copy sheets are sensitive. In addition, the camera tube 23 can be of any type which provides a beam of electromagnetic radiation for transferring the images carried by documents 24 to corresponding video intelligence signals. For example, laser beam camera tubes have been employed to generate video intelligence signals of a scene being observed. Whatever type of electromagnetic radiation is employed to form the defined beam for transferring document images from or to corresponding video intelligence signals, in accordance with the technique of the present invention, the beam of electromagnetic radiation is deflected in the direction of the travel of the conveyed sheets from or on which the document images are being transferred in time synchronizing relation with the conveyance of the sheets and the initiation of each image transferring operation.

Figure 2:
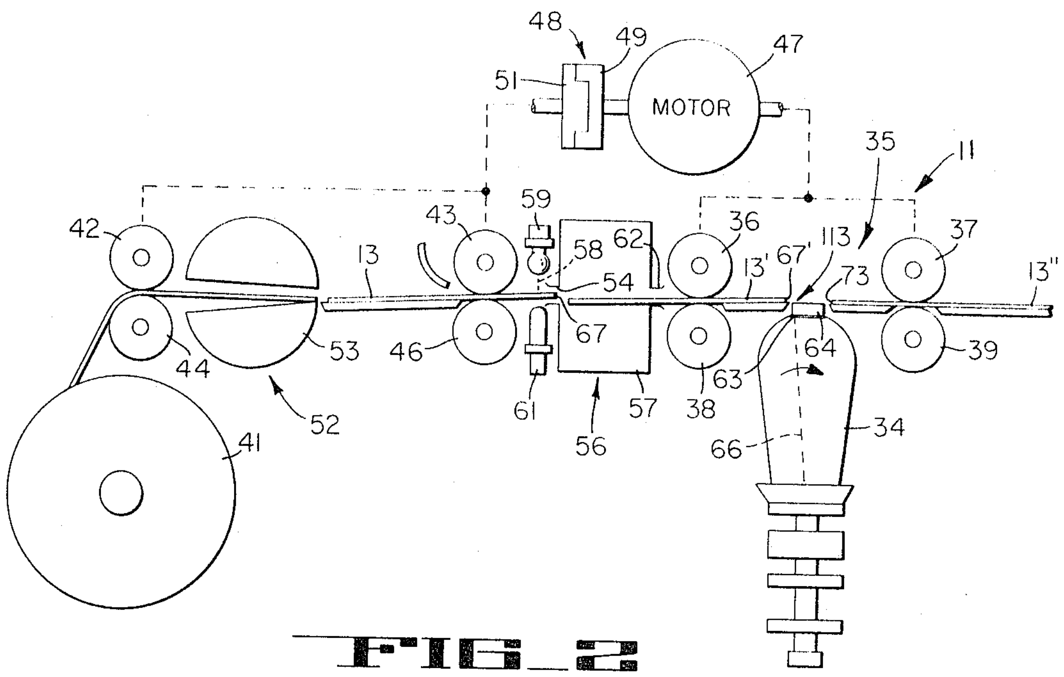
FIG. 2 is a schematic drawing of an electrostatic printer for providing hard copy forms of document images from single frame composite video signals.
Figure 3:
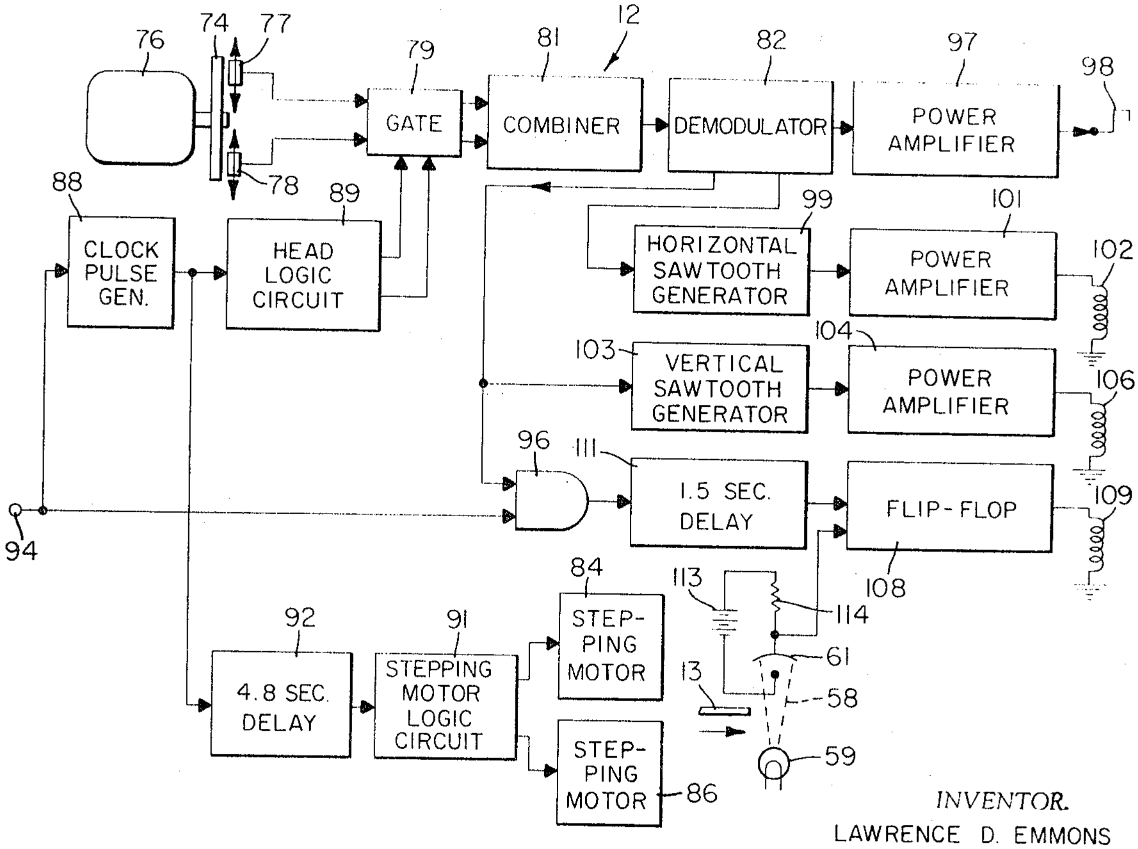
FIG. 3 is a schematic drawing of a circuit for controlling the electrostatic printer of FIG. 2 in accordance with the present invention.
Figure 4:
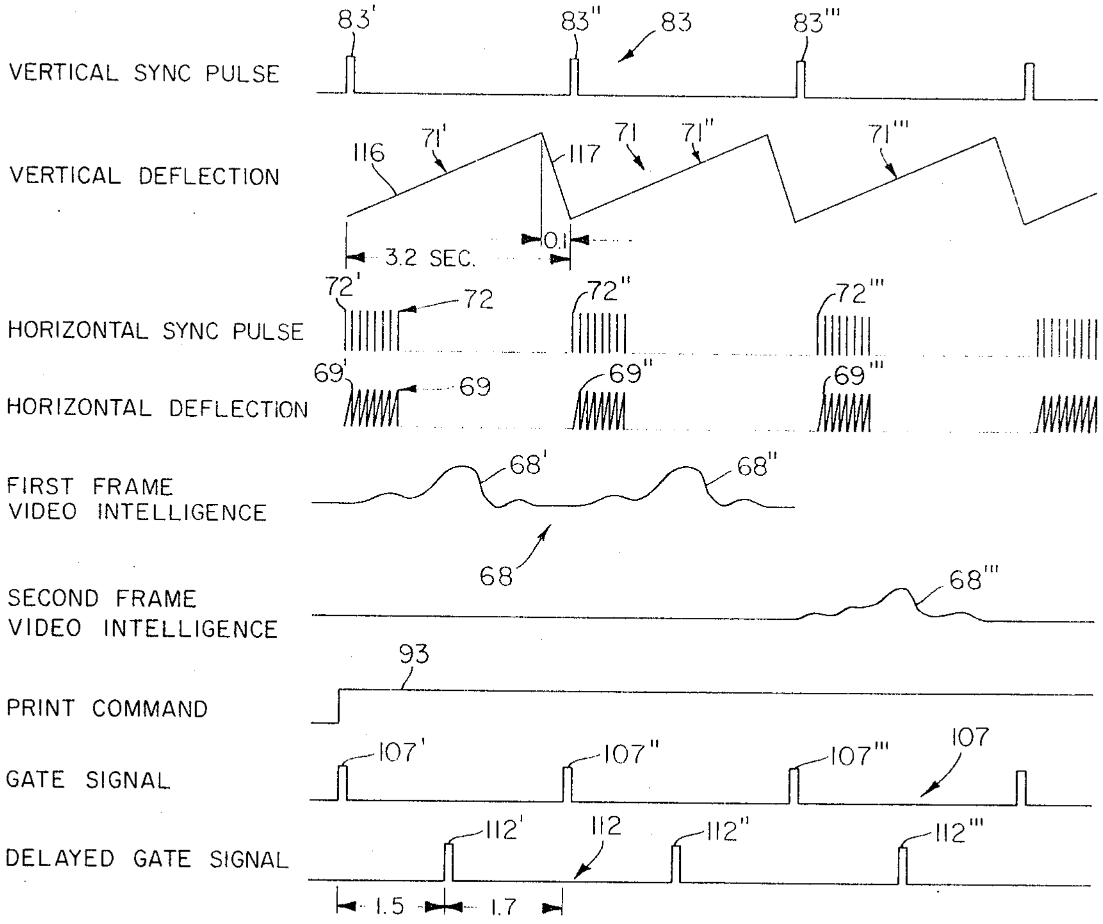
FIG. 4 is a timing diagram illustrating the sequence of operations of the elements of the electronic circuit of FIG. 3.

More specifically, referring to FIGS. 2 through 4, inclusive, copy sheets 13, measuring, for example, 8-½ by 11 inches and onto which document images are reproduced, are provided from a source or 8-½ inch wide roll 41 of photoelectrostatic sensitive copy paper. When a document image is to be transferred from the single frame sequential line scan composite video signal, the paper is drawn from the roll 41 by intermittently driven feed rollers 42 and 43 respectively operating against opposing idler rollers 44 and 46. The intermittently driven feed rollers 42 and 43 are driven by a motor 47 which is continuously operating but intermittently coupled to the driven feed rollers by an electrically actuated clutch 48, such as a friction clutch, having its motor driven and load or roller clutch plates 49 and 51 normally disengaged. By using a clutch 48 to couple the drive rollers 42 and 43 to be intermittently driven by the continuously operating motor 47 instead of intermittently energizing the motor 47, variations in sheet speed are minimized. When the clutch plates 49 and 51 are engaged, the drawn paper is first conveyed through a cutting station 52 having a paper cutting mechanism 53 which is operated to cut an 11 inch long copy sheet 13 from the roll 41. The cut copy sheet 13 is then conveyed to be positioned at the entrance or feed end 54 of a charging station 56 having a corona charging mechanism 57 thereat. The corona charging mechanism 57 sensitizes the copy sheet 13 by depositing a uniform charge thereon. When the cut copy sheet 13 reaches the feed end 54 of the charging station 56, its leading edge 67 interrupts an infrared beam 58 projected by a lamp 59 located on one side of the path traveled by the cut copy sheet 13 to impinge a photocell 61 located on the opposite side of the path. The edge sensing beam 58 is selected so that the copy sheet is insensitive or non-responsive to the electromagnetic radiation forming the beam 58. As the leading edge 67 of the cut copy sheet 13 interrupts the edge detecting infrared beam 58, a signal is generated which causes the clutch plates 49 and 51 to disengage, thereby, terminating the transport of the cut copy sheet 13 and the draw of paper from the roll 41.

As a copy sheet 13 is being cut and conveyed to be positioned at the feed end 54 of the charging station 56, a cut copy sheet 13′ previously cut and positioned at the feed end 54 of the charging station 56 is conveyed through the charging station 56 to be sensitized. As the sensitized sheet 13′ leaves the discharge end 62 of the charging station 56, it is conveyed towards the reproduce transducing station 35 by the driven feed roller 36 continuously driven by the motor 47 to operate against the opposing idler roller 38. To transfer the document image onto the sensitized copy sheet 13′ from the video intelligence signal, a standard line scan cathode ray image tube 34 having common magnetic focusing and deflecting elements is located at the reproduce transducing station 35. The image tube 34 has an electroluminescent screen 63 contiguous with a fiber optic faceplate 64 which is intermediate of the screen 63 and copy sheet 13′. The fiber optic faceplate 64 is positioned for direct contact with the sensitized copy sheet 13′ as it is conveyed through the reproduce transducing station 35. The image tube 34 generates a defined beam 66 of electromagnetic radiation in the form of a stream of electrons. As the electron beam 66 generated by the cathode ray image tube 34 impinges its electroluminescent screen 63, light is generated thereby in proportion to the current of the impinging beam 66. The generated light is transmitted by the portion of the fiber optic faceplate 64 contiguous to the stimulated area of the screen 63 to impinge the portion of the sensitized copy sheet contacting the transmitting portion of the faceplate 64. The impinging light alters the charge on the sensitized copy sheet in accordance with the intensity of the transmitted light, hence, the current of the impinging beam 66.

As will be explained in greater detail hereinbelow with reference to FIGS. 3 and 4, as the leading edge 67′ of the sensitized copy sheet 13′ reaches a location within the reproduce transducing station 35, the document image video intelligence signal 68 separated from the composite video signal is coupled to commence modulating the current of the electron beam 66 generated by the image tube 34, a horizontal deflection signal 69 is coupled to commence deflection the beam 66 to scan the screen 63, hence, faceplate 64, transverse to the direction of the travel of the sensitized copy sheet 13′ through the station 35, and a vertical deflection signal 71 is coupled to commence deflecting the beam 66 in the direction of the travel of the sensitized copy sheet 13′ through the station 35. As the sensitized copy sheet 13′ passes through the station 35, it is exposed to the light generated at the electroluminescent screen 63 as the modulated beam 66 of the cathode ray image tube 34 is transversely scanned a number of times equal to the number of line or horizontal scan synchronizing signals 72, hence, lines included in a single frame sequential line scan composite video signal carrying the document image video intelligence signal 68. Hence, the charge deposited on the copy sheet 13′ at the charging station 56 is altered in accordance with the document image video intelligence signal 68 modulating the current of the beam 66 to form a latent electrostatic image on the sensitized copy sheet 13′.

After an exposed copy sheet 13″ leaves the reproduce transducing station 35, it is conveyed by the continuously driven discharge roller 37 and associated idler roller 39 to a developing station and following fuser station (not shown) whereat the latent electrostatic image is changed to a permanent visible image. The copy sheets carrying reproduced document images are then discharged from the printer 11 into a suitable collecting bin or tray (not shown).

When deflecting the transducing beam 66 to introduce a separation between consecutively conveyed copy sheets 13, the scan of the copy sheets 13 should always begin at the same location on the copy sheets 13 proximate their respective leading edge 67. Hence, by deflecting the scanning beam 66 of the cathode ray image tube 34 in the direction of the travel of the copy sheets 13 through the reproduce transducing station 35, and synchronizing the conveyance of the copy sheets 13 within the deflection of the scanning beam 66 and the scan of the copy sheets 13, a separation of distance d (see FIG. 5A) will be introduced between the adjacent leading and trailing edges 67′ and 73 of consecutively conveyed sheets 13′ and 13″. As described hereinbefore, by providing a separation between consecutively conveyed copy sheets 13, they do not abut or overlap as they are conveyed. Hence, jamming and other problems associated with abutting and overlapping adjacent edges of consecutively conveyed sheets are avoided.

Figure 5A:
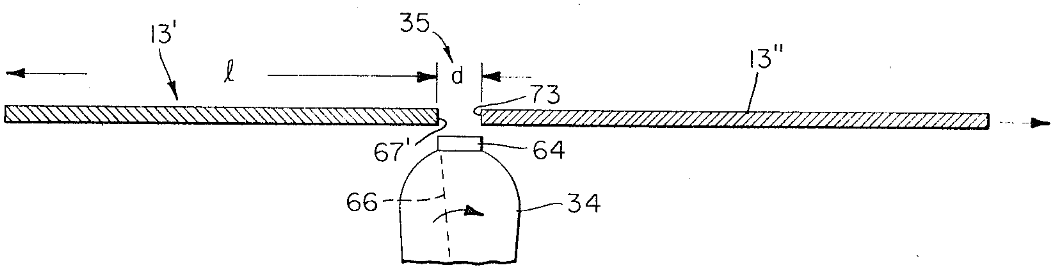
FIGS. 5A and 5B illustrate the relative position relationship between consecutive sheets transported for scanning by a beam of a cathode ray image tube comparing the relationship characteristic of the present invention and that of the prior art with FIG. 5(A) showing the relative position relationship obtained by the present invention and FIG. 5(B) showing the relationship obtained in accordance with prior art.
Figure 5B:
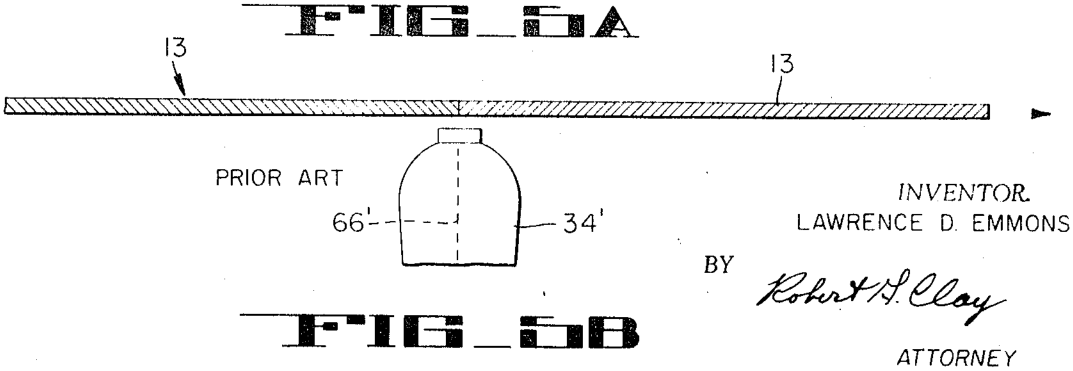

Referring to FIGS. 5(A) and 5(B), FIG. 5(A) illustrates the position relationship between consecutive copy sheets 13′ and 13″ as they are conveyed in accordance with the technique of the present invention. If the beam 66′ of the cathode ray image tube 34′ is not deflected in the direction of travel of the sheets 13, the adjacent edges of consecutive sheets will have to be abutted as illustrated in FIG. 5(B) in order reliably transfer document images from a series of consecutive, unseparated video intelligence signals.

To obtain the desired separation, *d*, between the consecutively conveyed copy sheets 13 while commencing the modulated beam scan of each of the copy sheets 13 at the same location thereon proximate its leading edge 67, the conveyance and scan of the copy sheet 13 are controlled by synchronizing the conveyance, beam modulation and beam deflections to the single frame composite video signals received from the video signal source 12. FIG. 3 illustrates a system for providing the necessary control signals to transfer document images onto copy sheets 13 from video intelligence signals stored on a magnetic disc 74 of the video signal source 12. In one embodiment constructed in accordance with the present invention, single frame sequential line scan composite video signals are stored as varying states of magnetization at separate pairs of concentric circular tracks on the magnetic disc 74. The disc 74 is rotated at a constant speed of 37.5 RPM by a motor 76 when transferring document images from magnetically recorded composite video signals. Two magnetic heads 77 and 78 are provided to reproduce the magnetically recorded composite video signals to in their corresponding electrical form. The magnetic heads 77 and 78 are positioned relative to each other and the magnetic disc 74 so that the magnetic head 77 reproduces the magnetically recorded composite video signals from the tracks carrying the first half of the single frame sequential line scan composite video signal while the other magnetic head 78 reproduces only from the tracks carrying the second half of the single frame composite video signal.

To obtain the single frame composite video signal from the magnetic disc 74, an electronic gate 79 is connected between the magnetic heads 77 and 78 and a video signal combiner 81 of the video signal source 12 to couple the combiner 81 alternately to the magnetic heads to receive the reproduced halves of the composite video signal therefrom. The video signal combiner 81 provides a composite video signal from the two recorded halves which is coupled to a video demodulator 82. The video demodulator 82 functions to demodulate the composite video signal to separate the document image video intelligence signal 68, the frame or vertical scan synchronizing pulse 83 and the line or horizontal scan synchronizing pulses 72. The horizontal scan synchronizing pulses 72 of the single frame sequential line scan composite video signal are coupled to commence transverse line scans by the beam 66 of the cathode ray image tube 34 in a time synchronizing relation with the modulation of the current of the beam 66 with the video intelligence signal 68 of the composite video signal. The vertical scan synchronizing pulse 83 of the composite video signal is coupled to commence the deflection of the beam 66 in a time synchronizing relation with the modulation of the current of the beam 66 with the video intelligence signal 68. The vertical scan synchronizing pulse 83 also is coupled to commence the conveyance of a copy sheet 13 through the charging station 56 towards the reproduce transducing station 35 so that its leading edge 67 enters the scan station as frame and line scan beam deflections and beam current modulation are commenced.

To transfer the several composite video signals recorded on the magnetic disc 74 into their corresponding electrical forms consecutively and in a rapid sequence, head stepping motors 84 and 86 respectively operatively associated with the carriages of the magnetic heads 77 and 78 are operated to move their associated heads to the next inwardly displaced track carrying the same half of another composite video signal after each track reproducing operation is performed by the associated heads. The stepping motors 84 and 86 are operated alternately and in time synchronizing relation with the gate 79 so that as one magnetic head 77 is coupling one half of a single frame composite video signal to the video signal combiner 81, the stepping motor 86 operatively associated with the other magnetic head 78 is energized to move the magnetic head 78 to position it for reproducing from a new track on the disc 74.

To synchronously operate the electronic gate 79 and the stepping motors 84 and 86, a clock pulse generator 88, servoed to the rotation of the magnetic disc 74, provides a train of timing pulses accurately spaced 1.6 seconds apart, with each timing pulse occurring in a time coinciding relation with the reproduction of the beginning of the halves of the composite video signals by the magnetic heads 77 and 78. The timing pulse are coupled to a head switching logic circuit 89, such as a flip-flop, which issues gate signals in response thereto to operate the electronic gate 79 to couple the video signal combiner 81 alternately at 1.6 second intervals to the magnetic heads 77 and 78. For example, when the flip-flop of the logic circuit 89 is set in a first of its bistable conduction states by a timing pulse issued by the generator 88, the electronic gate 79 is set to couple the magnetic head 77 to the video signal combiner 81 for an interval of 1.6 seconds. During this interval, the first half of a single frame composite video signal is transduced from the magnetic disc 74. At the end of the 1.6 second interval, a timing pulse sets the flip-flop of the logic circuit 89 to its other bistable conduction state. This sets the electronic gate 79 to couple the magnetic head 78 to the video signal combiner 81 for an interval of 1.6 seconds during which the second half of the single frame composite video signal is reproduced from the magnetic disc 74.

The timing pulses generated by the clock pulse generator 88 also are coupled to a head stepping motor logic circuit 91 through a 4.8 second delay 92, the purpose of which will be described in greater detail hereinbelow. The logic circuit 91, such as a flip-flop, issues gated drive signals alternately to the head stepping motors 84 and 86 in time synchronizing relation with the gate signals issued by the head switch logic circuit 89. The delay 92 prevents the stepping motors 84 and 86 from operating until the first one half of the first single frame video intelligence signal 68 recovered from the magnetic disc 74 by the head 77 is transferred to the copy sheet 13 as a document image. Following the transfer onto the copy sheet 13 of the first one half of the first single frame document image reproduced from the magnetically recorded composite video signal, the timing pulse sets the flip-flop of the logic circuit 91 in a first of its bistable conduction states. While the flip-flop is in this state, the logic circuit 91 issues a gated drive signal to energize the stepping motor 84 to transport the magnetic head 77 to a position to reproduce the first one half of a magnetically recorded composite video signals from a new track on the magnetic disc 74. While the stepping motor 84 is energized to transport the magnetic head 77 to a new position, the head switching logic circuit 89 issues a gate signal to set the electronic gate 79 to couple the magnetic head 78 to the video signal combiner 81 whereby the second one half of the composite video signal is reproduced from the magnetic disc 74.

The next timing pulse provided by the clock pulse generator 88 to the stepping motor logic circuit 91 is in time coinciding relation with the completion of the reproduction of the second one half single frame composite video signal by the magnetic head 78 and a timing pulse provided to the head stepping logic circuit 89. The stepping motor logic circuit 91 responds to this timing pulse by energizing the stepping motor 86 to transport the magnetic head 78 to a position to reproduce the second one half of a magnetically recorded composite video signal from a new track on the magnetic disc 74. While the stepping motor 86 is energized to transport the magnetic head 78 to a new position, the head switching logic circuit 89 issues a gate signal to set the electronic gate 79 to couple the magnetic head 77 to the video signal combiner 81 whereby the first one half of another composite video signal is reproduced from the magnetic disc 74. The magnetic heads 77 and 78 are continuously alternatingly coupled to the video signal combiner 81 and continuously alternatingly transported to new tracks of magnetically recorded composite video signals in this manner until all of the single frame composite video signals are transferred from the magnetic disc 74 to provide hard copies of the magnetically recorded document images. Further details of a video signal combiner, a magnetic head assembly, and head switching logic and head stepping motor logic circuits of the type employed in the apparatus of FIG. 3 can be had by reference to the U.S. Pat. application No. 713,900, filed Mar. 18, 1968, entitled "Head Mount," by Akiyoshi Iwata and assigned to the assignee of this application.

To transfer the sequential line scan video intelligence signals 68 to document images on the copy sheets 13, a print command signal 93 is input at terminal 94. The print command signal 93 is coupled to command the clock pulse generator 88 to issue the 1.6 second spaced timing pulses. The print command signal 93 also is coupled to an AND gate 96 to release its inhibit state and allow it to pass the vertical scan synchronizing pulse 83 received from the video demodulator 82 when a single frame sequential line scan composite video signal is received thereby for demodulation. The first timing pulse issued by the clock pulse generator 88 following the input of the print command signal 93 is coupled to cause the head switching logic circuit 89 to set the electronic gate 79 to couple video signal combiner 81 to receive the first one half of the initial single frame composite video signal reproduced from the magnetic disc 74 by the magnetic head 77. After an interval of 1.6 seconds, the clock pulse generator 88 issues a second timing pulse which causes the electronic gate 79 to couple the video signal combiner 81 to receive the second one half of the initial single frame composite video signal transduced from the magnetic disc 74 by the magnetic head 77. The video signal combiner 81 provides the recombined single frame sequential line scan composite video signal to the video demodulator 82 during a 3.2 second interval.

As described hereinabove, the video signal demodulator 82 separates the initial frame video intelligence signal 68', the associated vertical scan synchronizing pulse 83' and the associated set of horizontal scan synchronizing pulses 72'. The video intelligence signal 68' of the first frame is coupled to a power amplifier 97 which conditions the video intelligence signal 68' for coupling the cathode 98 of the cathode ray image tube 34 to modulate the current of the beam 66 provided thereby in accordance with the amplitude variations of the video intelligence signal 68'.

Simultaneously with the coupling of the video intelligence signal 68' to modulate the current of the tube's beam 66, the first horizontal scan synchronizing pulse 72' of the set included in the first single frame composite video signal is coupled from the video demodulator 82 to a horizontal sawtooth generator 99 to initiate the generation of the first horizontal line scan deflection signal 69'. The horizontal deflection signal 69' is amplifier by a power amplifier 101 and coupled to the horizontal electromagnetic deflection coil 102 of the cathode ray image tube 34 to commence the transverse line scan of the beam 66 in time synchronizing relation with the commencement of the modulation of the beam 66.

Also, simultaneously with the generation of the first horizontal deflection signal 69', the vertical scan synchronizing pulse 83' of the initial single frame composite video signal is coupled from the demodulator 82 to a vertical sawtooth generator 103 to initiate the generation of the first vertical deflection signal 71'. The vertical deflection signal 71' is amplified by a power amplifier 104 and coupled to the vertical electromagnetic deflection coil 106 of the cathode ray image tube 34 to commence the frame deflection of the beam 66 in the direction of the travel of the copy sheets 13 through the reproduce transducing station 35 in time synchronizing relation with the commencement of the modulation of the beam 66. The modulation of the beam 66 can be commenced simultaneously with the initiation of the deflection and transverse scan of the beam 66 or, as often done in practice, delayed an interval corresponding to a few complete transverse scans of the beam 66.

The vertical scan synchronizing pulse 83' of the initial single frame composite video signal also is coupled to the AND gate 96. Since the inhibit is released from the AND gate 96 by the print command signal 93, the AND gate issues a gate signal 107' which is coupled to a flip-flop 108 to set it in one of its bistable conduction states which provides excitation current to energize the clutch coil 109 to engage the clutch plates 49 and 51 of the electrically actuated friction clutch 48. As described hereinabove with reference to FIG. 2, when the clutch plates 49 and 51 are engaged, the intermittently driven feed rollers 42 and 43 are driven by the motor 47 to commence conveying a copy sheet 13 towards the reproduce transducing station 35 for scanning by the beam 66 of the cathode ray image tube 34 whereby the video intelligence signal 68' is transferred onto the copy sheet 13 as a latent electrostatic image of the document image.

If the leading edge 67 of the copy sheet 13 onto which the document image is to be transferred from the video intelligence signal 68 is positioned at the entrance of the reproduce transducing station 35 when the composite video signal carrying the video intelligence signal 68' to be transferred is reproduced from the magnetic disc 74, the energization of the clutch coil 109 can be arranged to occur in a time coinciding relation with the modulation, scan and deflection of the beam 66.

However, when employing a photoelectrostatic type printer 11 to provide hard copies of the document images stored on the magnetic disc 74 in the form of composite video signals, it is preferred to sensitize each of the copy sheets 13 onto which document images are to be transferred immediately before passing the sensitized sheets 13 through the reproduce transducing station 35. Hence, the first copy sheet 13'' onto which the first document image is to be transferred from the initial video intelligence signal 68' retrieved from the magnetic disc 74 is positioned upstream from the reproduce transducing station 35 a distance of about 6 inches to allow it to be passed through the charging station 56 before being conveyed through the station 35. Because the copy sheets 13 are positioned up-stream from the station 35, a delay must be introduced between the commencement of the conveyance and of the modulation, line scan and deflection of the beam 66 to enable synchronizing the entrance of the leading edge 67 of each of the copy sheets 13 into the reproduce transducing station 35 with the commencement of the modulation, line scan and deflection of the beam 66.

In the particular embodiment illustrated, the first gate signal 107' generated in time coinciding relation with the first generation of the vertical scan synchronizing pulse 83' of the initial video intelligence signal 68' is delayed 1.5 seconds by a delay means 111. Although the beam 66 is modulated, scanned and deflected during this 1.5 second interval, the 4.8 second delay 92 in the stepping motor drive circuit prevents the stepping motors from moving the magnetic heads 77 and 78 until they have completed two scans of the two tracks carrying the initial composite video signal to be transferred. Hence, the video intelligence signal 68 and associated vertical and horizontal scan synchronizing signals 83 and 72 of the initial composite video signal are generated twice in succession.

Between the first and second generations of the first video intelligence signal 68 and associated such synchronizing signals, the first delayed gate signal 112' sets the flip-flop 108 to energize the clutch coil 109, thereby, commencing the conveyance of the first copy sheet 13'' towards the reproduce transducing station 35. The time required for the leading edge 67 of a copy sheet 13 to travel the distance between the feed end 54 of the charging station 56 and the position within the station 35 which locates the place on the copy sheet 13 at the position 113 at which the first up-stream transverse line scan of the beam 66 occurs is 1.7 seconds. Hence, when the beam 66 is commenced to be simultaneously modulated by the second reproduction of the initial video intelligence signal 68'' and deflected by the second transduction of the vertical scan synchronizing pulse 83'' and the second reproduction of the first horizontal scan synchronizing signal 69'' associated with the initial composite video signal, the first copy sheet 13'' is positioned for receiving the document image.

While the first copy sheet 13'' is conveyed for scanning by the beam 66, the feed roller 42 draws additional copy paper from the roll 41. The second 11 inch long copy sheet 13' is cut from the drawn paper as it is fed through the cutting station 52, and, in turn, is conveyed to be positioned at the feed end 54 of the charging station 56 in preparation of transferring the second video intelligence signal 68''' thereon. As each of the copy sheets 13 is positioned at the feed end 54 of the charging station 56, it interrupts the infrared beam 58, hence, the current flow through the photocell 61 provided by a current source 113. A stop command signal is developed across the load resistor 114 which is coupled to the flip-flop 108 to set it in its other bistable conduction state to remove the energizing current from the clutch coil 109. This causes the clutch plates 49 and 51 of the friction clutch 49 to become disengaged whereby the conveyance of the copy sheet 13 at the feed end 54 of the charging station 56 is interrupted.

The conveyance of the second copy sheet 13' onto which the second document image is to be transferred from the second video intelligence signal 68''' is commenced by the delayed gate signal 112'' generated from the gate signal 107''. The gate signal 107'' is issued by the AND gate 96 during the second production of the first vertical scan synchronizing pulse 83'' as the initial composite video signal is reproduced the second time from the magnetic disc 74. Hence, the vertical synchronizing signal 68 obtained during a previous reproduction of the composite video signal from the magnetic disc 74 is employed to initiate the conveyance of the copy sheet 13 onto which document images are to be transferred from the composite video signal currently being reproduced from the magnetic disc 74. However, because the spacing between the vertical scan synchronizing signals 83 of successive frames of composite video signals is precise, the proper synchronization is maintained between the conveyance, beam modulation and scan of the copy sheets 13.

Therefore, when the leading edge 67' of the second sensitized copy sheet 13' reaches a position, location 113 in the specific embodiment described, within the reproduce transducing station 35, the modulation and deflection of the beam 66 is commenced by the second video intelligence signal 68''' and associated vertical and horizontal scan synchronizing pulses 83''' and 72''' to transfer the second magnetically recorded document image onto the second sensitized copy sheet 13'. Since the beam 66 is deflected in the direction of the travel of the copy sheets 13 through the reproduce transducing station 35 as it scans the sheets during the image transferring operation, and since the scanning is terminated when the trailing edge 73 of a copy sheet 13 leaves the reproduce transducing station 35, the leading and trailing edges 67 and 73 of consecutively conveyed copy sheets 13 will be separated by the distance, *d*.

In the specific embodiment illustrated in the drawings, the magnetic disc 74 is rotated at 37.5 RPM by the motor 76 to provide a 3.2 second composite video signal commencing every 3.2 seconds. The halves of the composite video signals are separately recorded on identical lengths of two tracks which, when reproduced and recombined, form the composite video signal having the video intelligence signal occupying 3.1 seconds of the 3.2 second interval. The vertical deflection signal 71 includes a first ramp portion 116 having a duration of 3.1 seconds which deflects the beam 66 in the direction of the travel of the copy sheets 13 through the reproduce transducing station 35 during an image transferring operation. The vertical deflection signal 72 also includes a second retracing ramp portion 117 having a duration of 0.1 second to reposition the beam 66 at the location 113 after each image transferring operation is completed in preparation of transferring another document image.

For a fiber optic faceplate 64 having a dimension, *d*, of 0.25 inch, the vertical sawtooth generator 103 is adjusted to provide a vertical deflection signal 71 at an amplitude sufficient to deflect the beam 66 in the direction of the travel of the copy sheets 13 at a rate of about 0.08 inch per second. The motor 47 is operated to convey the copy sheets 13 through the reproduce transducing station 35 at selected speed greater than the rate at which the beam 66 is deflected in the direction of the travel of the copy sheets 13 so that the copy sheet 13 is in the reproduce transducing station 35 during the transfer of a single frame or at least 3.1 seconds. However, preferably, it is desired to adjust the speed of the conveyance of the copy sheet 13 relative to the beam deflection rate so that the trailing edge 73 of the copy sheet 13 leaves the reproduce transducing station immediately following the last transverse line scan of the beam 66 of the raster of lines forming the single frame video signal. This requires a velocity of sheet conveyance equal to the deflection rate of the beam 66 times $(l + d)/d$ where $l$ is the length of the copy sheets 13. If the copy sheets 13 are conveyed at a velocity less than $(l + d)/d$ times the deflection rate, the copy sheets 13 will be transported through the reproduce transducing station 35 in a time less than required to transfer a single frame video intelligence signal. Hence, information will be lost since an incomplete document image will be transferred onto the copy sheet 13. If the copy sheets 13 are conveyed at a velocity greater than $(l + d)/d$ times the deflection rate, the document image will be transferred onto the copy sheet 13 in a space less than the full length, l, of the copy sheet 13. In the foregoing example, the motor 47 is operated to convey the 11 inch long copy sheets 13 through the reproduce transducing station 35 at a speed of about 3.5 inches per second.

When the document images are stored on the magnetic disc 74 as 1,280 line composite video signals, the horizontal scan synchronizing pulses 72 are provided by the video demodulator 82 at a 400 Hz rate. For a fiber optic faceplate 64 having a dimension of 9 inches transverse to the travel of the sheets 13, the horizontal sawtooth generator 103 is adjusted to provide horizontal deflection signals 69 at rate of 400 Hz with each one of an amplitude sufficient to deflect and retrace the beam 66 across the transverse dimension of the faceplate 64 in about 2.5 milliseconds.

While the technique of the present invention for maintaining a space between consecutive sheets from or onto which document images are transferred into or from video intelligence signals has been described in detail with reference to particular sheet, document image and video signal processing apparatus which impose particular requirements, it is intended only to illustrate one particularly useful application of the technique. For example, instead of delaying the gate signal 107 to insure that a copy sheet 13 enters the reproduce transducing station 35 in the proper time synchronizing relation with the modulation and deflections of the beam 66 of the cathode ray image tube 34, the video intelligence signal 68 output by the video demodulator 82, the vertical deflection signal 71 output by the vertical sawtooth generator 99 and the horizontal deflection signals 69 output by the horizontal sawtooth generator 103 could be delayed by 1.7 seconds whereby the leading edge 67 of the copy sheet 13 would arrive at the reproduce transducing station 35 in time coinciding relation to the modulation and deflections of the beam 66. Furthermore, if the document images signals are recorded on a magnetic video tape, the frame marker pulses commonly recorded on a control track of the tape in time coinciding relation with the frame or vertical scan synchronizing signal could be employed to control the generation of the vertical deflection signals 71 and operation of the electrically actuated clutch 109.

Also, when transferring the document images from documents 24 to video intelligence signals for storage or transmission to a distant terminal station, the frame and line scan synchronizing signals generated by a synchronizing signal generator are employed to commence the conveyance of the image carrying documents 24 in a time synchronizing relation to the deflection of the camera tube's beam in the same manner as the vertical and horizontal scan synchronizing pulses 82 and 72 are employed when reproducing hard copies of document images from magnetically stored single frame composite video signals. The synchronizing signal generator provides the frame and line scan synchronizing signals to control the operation of the electromagnetic radiation beam source or camera 23 to form the video intelligence signal as its beam scans the image carrying documents 24. The synchronizing signals are combined with the produced video intelligence signal to form the composite video signal. The frame scan synchronizing signal commences the conveyance of the image carrying documents 24 in a time synchronizing relation to the deflection of the beam of the camera in the direction of travel of the documents 24 through the read transducing station 27. The transverse line scanning of the image carrying documents 24 is commenced by the line scan synchronizing signal in time coinciding relation to the deflection of the beam in the direction of travel of the image carrying documents 24 through read transducing station.

From the foregoing description, it is seen that, in accordance with the technique of the present invention, a space is maintained between consecutively conveyed sheets while document images are transferred from or to single frame video intelligence signals by deflection the image transferring beam generated by an electromagnetic radiation beam source in the direction of the travel of the sheet through the transducing station during the transverse line scans of the sheet by the beam, and time synchronizing the commencement of the conveyance of the sheets to the commencement of the deflection and line scans of the beam.

What is claimed is:

1. Method for maintaining a space between sheets that are consecutively conveyed through a transducing station wherein they are scanned a selected number of times by a beam of electromagnetic radiation to transfer image intelligence between each of the conveyed sheets and a video signal processing system; the image intelligence being in the form of a document image on the sheet and in the form of a composite video signal in the video signal processing system; and each composite video signal being of a selected period and including a video intelligence signal, a frame scan synchronizing signal and a selected number of line scan synchronizing signals; the steps comprising:

commencing the conveyance of each sheet in a time synchronized relation with the frame scan synchronizing signal of a single frame composite video signal to pass each sheet through the transducing station; and deflecting the beam from an initial position in the direction of travel of the sheets through the station a selected distance according to the desired spacing between consecutive sheets in a time synchronized relation with the frame scan synchronizing signal each time a sheet enters the station as the beam is deflected transversely of the direction of travel in time synchronized relation with the line scan synchronizing signals to line scan the sheet and transfer image intelligence between the conveyed sheet and the video signal processing system.

2. The method according to claim 1 wherein the deflecting step includes:

commencing the deflection from the initial position in the direction of travel of the sheets through the station each time a sheet enters the station; and deflecting the beam the said selected distance in the direction of travel of the sheets at a rate less than and relative to the rate of conveyance of the sheets through the station to distribute the transverse line scans of the beam uniformly over the area of the sheet provided for document images with each line scan further from the leading edge of the scanned sheet than the previous line scan.

3. The method according to claim 2 wherein the sheets are conveyed through the transducing station at a rate greater than the rate at which the beam is deflected in the direction of travel of the sheets by the multiple of the sum of the length of the sheet and length of the transducing station divided by the length of the transducing station.

4. The method according to claim 1 further comprising the step of deflecting the beam opposite the direction of travel of the sheets through the transducing station after the transfer of image intelligence to position the beam at the initial position prior to the passage of the next of the consecutive sheets through the transducing station.

5. The method according to claim 4 wherein the sheet has a leading edge, further comprising positioning the leading edge a known distance from a location at the transducing station at which it is positioned when the transfer of image intelligence is commenced, the conveyance of the sheet commenced to pass it through the transducing station when its leading edge is positioned the known distance, and delaying the deflection of the beam in the direction of travel of the sheets for an interval required to convey the leading edge of the sheet the said known distance.

6. The method according to claim 5 further comprising the step of providing the frame scan synchronizing signal before the deflection of the beam is commenced, the conveyance of said sheet commenced in time synchronizing relation with the said provided frame scan synchronizing signal an interval before the deflection of the beam is commenced corresponding to the interval required to convey the leading edge of the sheet the known distance whereby the deflection of the beam in the direction of travel of the sheets is delayed for the said interval required to convey the leading edge.

7. The method according to claim 5 further comprising the steps of:

providing another frame scan synchronizing signal an interval after the said frame scan synchronizing signal that commenced the conveyance of the sheet at least equal to that required to convey the leading edge of the sheet the known distance; and commencing the deflection of the beam in the direction of travel of the sheets in time coinciding relation with the said other frame scan synchronizing signal.

8. The method according to claim 1 wherein copy sheets are conveyed through the transducing station to be scanned by a beam modulated with single frame video intelligence signals provided by the video signal processing system to transfer corresponding images onto the copy sheets, further comprising the step of modulating the beam with a single frame video intelligence signal of a composite video signal in time synchronizing relation with the frame scan synchronizing signal as the beam is deflected in the direction of travel of the sheets whereby the scanning modulated beam transfers image intelligence onto the copy sheets.

9. The method according to claim 8 wherein the copy sheet has a leading edge, further comprising positioning the leading edge a known distance from a location at the transducing station at which it is positioned when the transfer of image intelligence is commenced, the conveyance of the copy sheet commenced to pass it through the transducing station when its leading edge is positioned the known distance, and delaying the deflection of the beam in the direction of travel of the sheets for an interval required to convey the leading edge of the sheet the said known distance.

10. The method according to claim 9 further comprising the steps of:

providing a frame scan synchronizing signal before the deflection of the beam is commenced;

providing another frame scan synchronizing signal from the composite video signal including the video intelligence signal to be transferred onto the conveyed copy sheet an interval after said frame scan synchronizing signal that commenced the conveyance of the copy sheet at least equal to that required to convey the leading edge of the copy sheet the known distance;

commencing the deflection of the beam in time coinciding relation with the said other frame scan synchronizing signal; and commencing the modulation of the beam with the singnal frame video intelligence signal associated with the said other frame scan synchronizing signal in time synchronizing relation with the said other frame scan synchronizing signal.

11. The method according to claim 8 wherein the single frame composite video signals are stored on magnetic recording medium, further comprising the step of consecutively reproducing the composite video signals from the magnetic recording medium for modulating the beam with the video intelligence signals in time synchronizing relation with the consecutive conveying of copy sheets through the transducing station.

12. The method according to claim 11 wherein the copy sheet has a leading edge, further comprising positioning the leading edge a known distance from a location at the transducing station at which it is positioned when the transfer of image intelligence is commenced, the conveyance of the copy sheet commenced to pass it through the transducing station when its leading edge is positioned the known distance, and delaying the deflection of the beam in the direction of travel of the sheets for an interval required to convey the leading edge of the sheet the said known distance.

13. The method according to claim 12 wherein the consecutive copy sheets are conveyed through the transducing station at regular intervals without interruption further comprising the steps of:

reproducing from the magnetic recording medium two successive times the single frame composite video signal including the image intelligence to be transferred to the first of the consecutive copy sheets conveyed through the station before consecutively reproducing the other single frame composite video signals from the magnetic recording medium;

commencing the conveyance of the first copy sheet in time synchronizing relation with the frame scan synchronizing signal of the first reproduction of the twice-reproduced composite video signal to position the leading of the first copy sheet at the location the transducing station where the transfer of image intelligence is commenced in time coinciding relation with the second reproduction of the twice-reproduced composite video signal;

commencing the deflection of the beam in time coinciding relation with the frame scan synchronizing signal of the second reproduction of the twice-reproduced composite video signal; and commencing the modulation of the beam with the single frame video intelligence signal of the second reproduction of the twice-reproduced composite video signal in time synchronizing relation with the associated frame scan synchronizing signal.

14. The method according to claim 13 wherein following the first of consecutive copy sheets the conveyance of each copy sheet is commenced in time synchronizing relation with the frame scan synchronizing signal of the composite video signal including the video image intelligence being transferred to the copy sheet then being conveyed through the transducing station.

15. A line scan printer for providing hard copies of document images in the form of single frame video signals comprising means for generating a beam of electromagnetic radiation to scan copy sheets sensitized to retain a record of the information carried by the scanning beam; means for consecutively conveying on command sensitized copy sheets for scanning by the beam; a magnetic recording medium for storing single frame sequential line scan composite video signals, each of said stored single frame composite video signals being of a selected period and included a sequential line scan video intelligence signal, a frame scan synchronizing signal and a selected number of line scan synchronizing signals; means for consecutively reproducing the composite video signals from the magnetic recording medium and separating the video intelligence signal and the frame scan and line scan synchronizing signals from the reproduced composite video signal; means for generating command signals for commanding the copy sheet conveying means to convey the sheets consecutively for scanning by the beam in time synchronizing relation with the frame scan synchronizing signals; means for coupling the video intelligence signals to intelligence modulate the beam each time a leading edge of a copy sheet is positioned to locate the copy sheet for scanning by the beams; means for generating line scan deflection signals in time synchronizing relation with the line scan synchronizing signals of each single frame composite video signal and coupling the line scan deflection signals to deflect the beam transverse to the travel of the copy sheets as they are scanned by the beam, the first of the line scan deflection signals generated during each frame in time coinciding relation with the positioning of the leading edge of the copy sheets to locate the copy sheet for scanning by the beam; and means for generating frame scan deflection signals in time synchronizing relation with the frame scan synchronizing signals of the single frame composite video signals and coupling each of the frame scan deflection signals to deflect the beam in the direction of travel of the copy sheets as they are scanned by the beam in time coinciding relation with the positioning of copy sheets for scanning by the beam, each of said frame scan deflection signals of an interval to allow each copy sheet to be transversely scanned by the beam a number of times equal to the number of line scan synchronizing signals included in the single frame composite video signal.

16. The apparatus according to claim 15 wherein said frame scan deflection signal generator provides signals productive of deflecting the beam in the direction of travel of the copy sheets at a rate less than and relative to the rate of conveyance of the copy sheets to distribute the transverse line scans of the beam uniformly over the area of the copy sheet provided for document images with each line scan further from the leading edge than the previous line scan.

* * * * *

PO-1050
(5/69)

UNITED STATES PATENT OFFICE
CERTIFICATE OF CORRECTION

Patent No. 3,665,099 Dated May 23, 1972

Inventor(s) LAWRENCE D. EMMONS

It is certified that error appears in the above-identified patent and that said Letters Patent are hereby corrected as shown below:

| | |
|---|---|
| IN THE TITLE, | change "TRANSDUCED" to --TRANSFERRED--. |
| Column 3, line 23, | after "become" insert --more--. |
| Column 4, line 29, | change "24" to --34--. |
| Column 6, line 1, | change "deflection" to --deflecting--. |
| line 74, | delete "to". |
| Column 7, line 59, | change "pulse" to --pulses--. |
| lines 68 and 69, | change "transduced" to --reproduced--. |
| Column 9, line 12, | after "coupling" insert --to--. |
| line 23, | change "amplifier" to --amplified--. |
| Column 10, line 32, | change "such" to --scan--. |
| Column 12, line 68, | change "deflection" to --deflecting--. |
| Column 14, line 45, | change "singnal" to -- single --. |

Signed and sealed this 15th day of May 1973.

(SEAL)
Attest:

EDWARD M.FLETCHER,JR.
Attesting Officer

ROBERT GOTTSCHALK
Commissioner of Patents